Feb. 20, 1951 J. DE SWART 2,542,753
SHELF SUPPORT
Filed Jan. 15, 1947 2 Sheets-Sheet 1
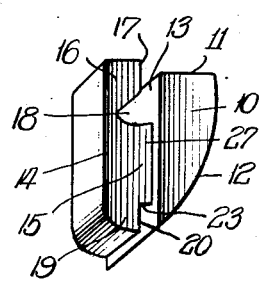
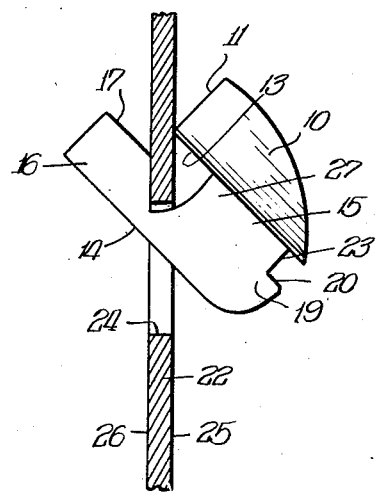
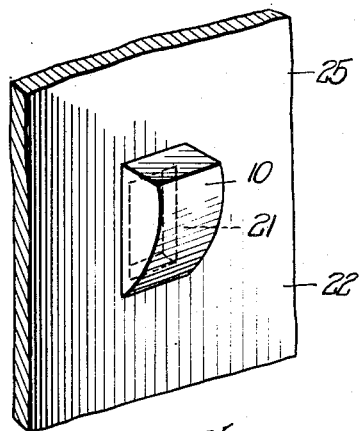
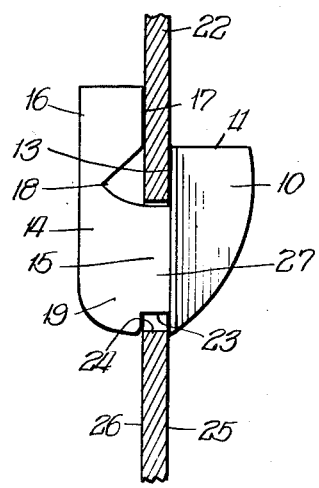
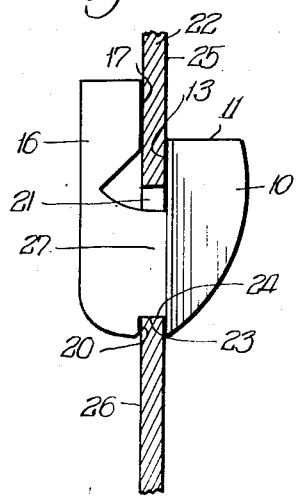
INVENTOR.
Jan de Swart,
BY
Cromwell, Greist & Warden
ATTYS Feb. 20, 1951     J. DE SWART     2,542,753
SHELF SUPPORT
Filed Jan. 15, 1947     2 Sheets-Sheet 2
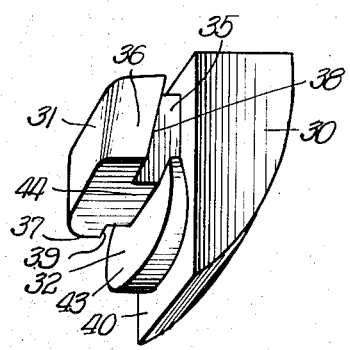
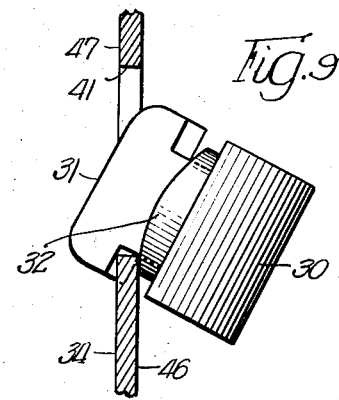
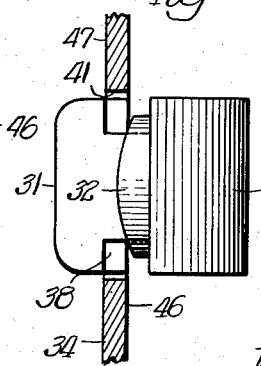
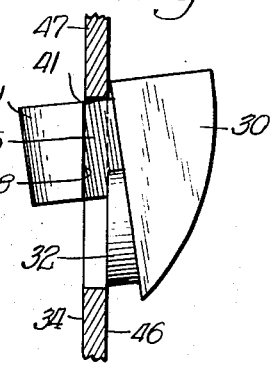
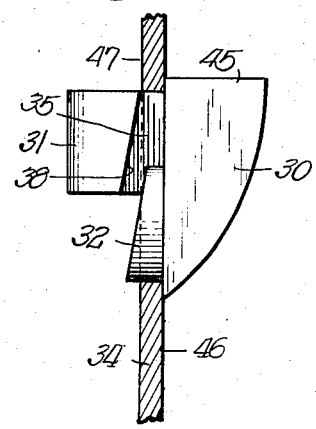
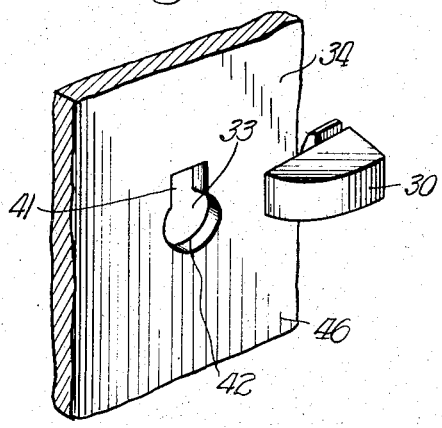
INVENTOR.
Jan de Swart,
BY
Cromwell, Greist & Warden
Attys.

Patented Feb. 20, 1951

2,542,753

UNITED STATES PATENT OFFICE 2,542,753

SHELF SUPPORT

Jan de Swart, Los Angeles, Calif., assignor to Shellmar Products Corporation, Chicago, Ill., a corporation of Delaware Application January 15, 1947, Serial No. 722,203

2 Claims. (Cl. 248—239)

My invention is concerned with improvements in a shelf support or bracket.

It is an object of my invention to provide a shelf support or bracket member which is particularly adapted to be secured in an aperture in a relatively thin vertical wall, such as a cabinet wall or the like, where only one side of the wall is readily accessible, which shelf support is adapted to be detachably positioned in the aperture so that it is locked in position and will not turn or pivot therein.

It is an object of my invention to provide a shelf support or bracket of the blind fastener type which comprises a shelf supporting portion, a laterally positioned attaching portion and a connecting portion of reduced cross section whereby when the attaching portion is passed through an aperture in a wall the support can be arranged with opposed faces of the shelf-supporting portion and the attaching portion in interlocking engagement with opposite faces of the apertured wall.

It is a further object of my invention to provide a supporting device having an attaching means and a locking means wherein the attaching means is so constructed that it is adapted to be passed through a keyhole aperture in a wall and the locking means is so constructed that it is adapted to be moved into the aperture to attach the device to the wall and to lock it in operative position thereon.

It is another object of my invention to provide a bracket member having an article supporting portion and a headed attaching portion which is adapted to cooperate with an aperture in a supporting member to detachably mount the bracket in article supporting position thereon and to latch the same against pivotal or swinging movement.

These and other objects will be apparent from a description of the preferred form of my device and the modifications thereof which are shown by way of illustration in the accompanying drawings, wherein:

Fig. 1 is a perspective view of a shelf support embodying the principles of my invention;

Fig. 2 is a perspective view of the shelf support attached to a supporting wall member;

Fig. 3 is a vertical section showing the shelf support with its attaching member partially inserted in the aperture in the supporting wall;

Fig. 4 is a vertical section showing the shelf support with its attaching member fully inserted in the aperture;

Fig. 5 is a vertical section showing the shelf support with its attaching member fully inserted and latched in final position in the aperture;

Fig. 6 is a perspective view of a modified form of shelf support embodying the principles of my invention;

Fig. 7 is a perspective view of the modified shelf support in fully inserted and latched position on a supporting wall;

Fig. 8 is a perspective view of the modified shelf support in position for insertion in an aperture in the supporting wall;

Fig. 9 is a vertical section showing the modified shelf support with its attaching member partially inserted in the aperture;

Fig. 10 is a section as in Fig. 9 but showing the shelf support with its attaching member fully inserted in the aperture;

Fig. 11 is a section as in Fig. 10 but showing a shelf support rotated 90 degrees counterclockwise; and Fig. 12 is a vertical section as in Fig. 11 but showing the shelf support with its attaching member moved upwardly into final position and with its latching member moved into latching position in the lower portion of the aperture.

The preferred form of my shelf support and the method of attaching it to an apertured supporting wall is illustrated in Figs. 1 to 5 inclusive of the drawings.

The support or bracket comprises a main or body portion 10 provided with a top ledge 11 for supporting the edge of a shelf or similar article. The forward or front face 12 of the support may be curved as shown. The rear wall 13 forms a vertical abutment face which is adapted to be positioned in engagement with one face of a supporting wall or other supporting member.

The support is provided with a generally rectangular attaching portion or member 14 which is integrally connected to the body portion 10 by a connecting portion or member 15 of reduced cross section. The connecting member 15 has a depth or thickness slightly greater than the thickness of the wall member to which the support is to be attached.

A portion 16 of the member 14 extends above the connecting member 15 and is provided with a forward face or abutment surface 17. The lower portion of face 17 is cut away to provide a transverse recess or groove 18. The lower portion 19 of the member 14 extends below the connecting member 15 and is provided with a forward face or abutment surface 20.

The attaching portion 14 of the support is adapted to be inserted in a rectangular aperture 21 in a supporting member 22 (Fig. 3) by first passing the top portion 16 thereof through the aperture 21 while the support is tilted at an angle, as in Fig. 3, and then pivoting or tilting the support to an upright position, as in Fig. 4, and finally moving the support downwardly as in Fig. 5 to bring the lower face 23 of the connecting member 15 into engagement with the wall or surface 24 which forms the bottom of the aperture 21.

When the support is in the position shown in Figs. 2 and 5 the abutment face 13 is in abutting relation or engagement with the face 25 of the supporting member 22 and the abutment faces 17 and 20 are in abutting engagement with the face 26 of the supporting member 22. Movement away from either face of the supporting member 22 is effectively prevented. The vertical sides 27 of the connecting member 15 limit the movement of the support in a transverse direction, the transverse width of connecting member 15 being only slightly smaller than the width of aperture 21 so that the support will not have any appreciable movement in a sidewise direction and it will not rotate in the aperture 21. The support may be readily removed from the aperture 21 by first moving it upwardly to disengage surfaces 20 and 26 and then pivoting the member outwardly and upwardly, after which portion 16 of attaching member 14 may be moved downwardly and outwardly to remove it from the aperture 21.

A modified from of my support is illustrated in Figs. 6 to 12. In this form of my invention the body portion 30 is illustrated as identical with that shown in the preferred form, while the attaching member 31 and latching member 32 are designed for insertion in a keyhole aperture 33 (Fig. 8) in a supporting wall member 34.

The attaching member 31 comprises a transversely arranged generally rectangular member integrally connected to the body 30 by a connecting member 35 of reduced cross section. The ends 36 and 37 of the member 31 extend beyond the connecting member 35 and are provided with beveled faces 38 and 39 in opposed spaced relation to the rear or abutment face 40 of member 30. Thus the transverse width of connecting member 35 is less than the width of attaching member 31 while the width of the attaching member 31 minus the width of one face 38 or 39 is somewhat less than the vertical depth of the keyhole aperture 33 and the total width of the attaching member 31 is greater than the width of the top portion 41 of the keyhole aperture 33.

The latching member 32 is formed by an integral semi-cylindrical section extending outwardly from face 40 of body portion 30 and below the attaching member 31. It is slightly smaller in diameter than the round portion 42 of the keyhole aperture 33 and has a rearward face 43 which slopes upwardly toward the attaching member 31 and inwardly toward the body portion 30. The thickness or depth of member 32 at its top is less than the depth of the lower face 44 of connecting member 35 to which it extends.

This form of my support is adapted to be inserted in the aperture 33 in the wall 34 by positioning the support as shown in Fig. 8 and passing the attaching member 31 through the aperture 33 by a tilting or pivoting movement as shown in Figs. 9 and 10. The support is then rotated to bring the top or supporting surface 45 of the body portion 30 into the uppermost position after which the whole support is moved upwardly until the latching member 32 may be moved into the round portion 42 of the aperture 33 to bring abutment surface 40 into engagement with the outer face 46 of the wall 34. In this position the upper edges of abutment faces 38 and 39 engage the rear face 47 of the wall 34 and prevent removal of the support in a direction normal to the wall 34. The sides of the connecting member 35 cooperate with the sides of the rectangular top portion 41 of the aperture 33 to prevent sidewise movement or rotation of the support.

I have illustrated my support as particularly adapted to be secured on a relatively thin wall having an aperture provided therein, but it will be understood that the support may be secured to any member having a recess provided therein for receiving the attaching portion of the support. Likewise, other details of my support are to be taken as illustrative only. Modifications within the spirit of my invention will be apparent to those skilled in this art.

I claim:

1. A detachable bracket adapted to be secured on a wall member having a keyhole aperture therein, said bracket comprising an article supporting member, an attaching member and a latching member, said attaching member being spaced from said article supporting member and connected thereto by a connecting portion of reduced cross section which is of a size and shape to be received in the rectangular portion of the keyhole aperture, said attaching member having one dimension of greater length than the width of said rectangular portion of said keyhole aperture and said latching member being of a size and shape to be received in the circular portion of said keyhole slot whereby said bracket may be latched in position.

2. A detachable bracket adapted to be secured on a wall member having a keyhole aperture therein, said bracket comprising an article supporting member, an attaching member and a latching member, said attaching member being spaced from said article supporting member and connected thereto by a connecting portion of reduced cross section which is of a size and shape to be received in the rectangular portion of the keyhole aperture, said attaching member extending in one direction a distance which is greater than the width of said rectangular portion of said keyhole aperture but less than the largest dimension of said keyhole aperture and said latching member being of a size and shape to be seated in the circular portion of said keyhole slot whereby said bracket may be latched in fixed position in said aperture.

JAN DE SWART.

REFERENCES CITED

The following references are of record in the file of this patent:

UNITED STATES PATENTS

| Number | Name | Date |
|---|---|---|
| 182,201 | Ker | Sept. 12, 1876 |
| 567,002 | Poindexter | Sept. 1, 1896 |
| 1,343,327 | Levene | June 15, 1920 |
| 1,951,196 | Meadows et al. | Mar. 13, 1934 |
| 2,098,997 | Bramming | Nov. 16, 1937 |
| 2,157,309 | Swedman et al. | May 9, 1939 |